United States Patent Office 2,822,201
Patented Feb. 4, 1958

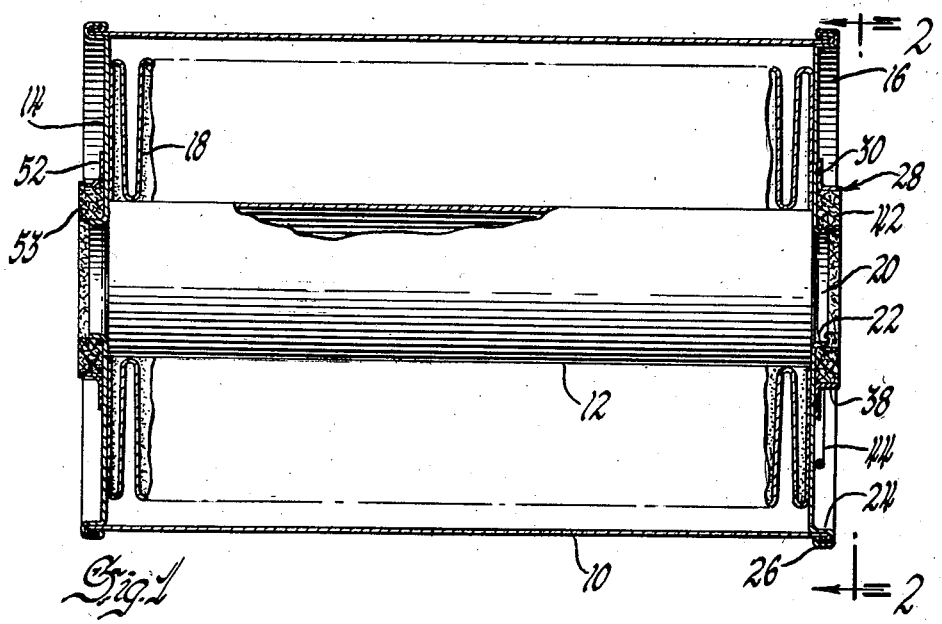
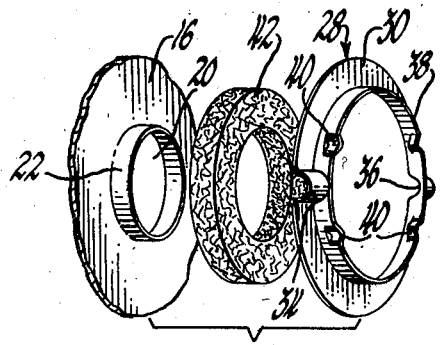
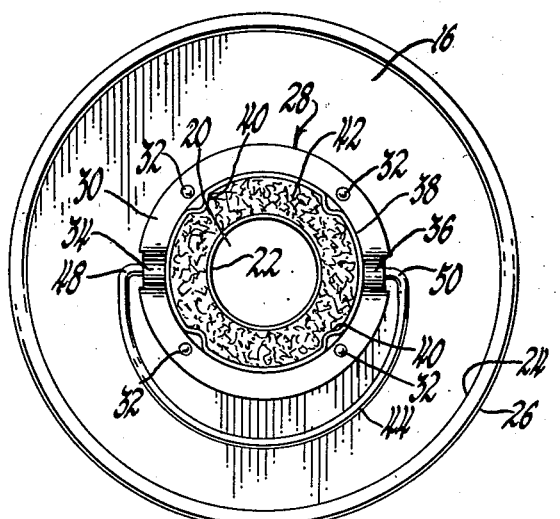

2,822,201
FILTER ELEMENT SEALING CONSTRUCTION

Herman A. Wood, Flint, Mich., assignor to General Motors Corporation, Detroit, Mich., a corporation of Delaware Application June 30, 1954, Serial No. 440,378

2 Claims. (Cl. 288—1)

This invention relates to filters and more particularly to replacement filter elements for cleaning fluids such as lubricating oils used in automobile engines, these elements being of the type employing an apertured end plate with a seal for determining the path of fluid flow.

Conventional filter elements of the replaceable type for use in filtering fluids such as oil used in automobiles generally include a body of porous filtering material confined between two coaxial tubular members and end plates joining the tubular members. The tubular members are formed of perforated material and fluid undergoing cleansing may, therefore, pass through the body of filtering material by way of those members. The end plates are made of fluid impervious material and form fluid tight joints with the tubular members.

In the use of a replaceable sealing element within a fluid conveying system, the end plates must be arranged in sealed relation with a casing enclosing the filter element so that the fluid cannot by-pass the element but must pass through the filtering material. It is for this reason that sealing gaskets are generally located around the end-plate apertures communicating with the interior tubular member which defines a central passage within the filter. Problems of manufacture have arisen in the satisfactory joinder of these sealing gaskets to the end plates. Another difficulty has arisen in devising a satisfactory means for firmly grasping and removing the filter element from its casing when it is to be replaced after use as considerable force is sometimes necessary to dislodge the messy and oily element from its container after it has become encrusted with sludge.

An object of this invention is to provide a filter element with an improved arrangement for retaining a sealing gasket on an end plate. Another object is to provide a filter element with an improved and inexpensive means for retaining a sealing gasket and a bail.

One feature of the invention is a ring or annular member fixed to a filter element end plate and having radial projections extending into a sealing gasket to retain the latter in position. Another feature of the invention is a ring fixed to an end plate for locating a sealing gasket and forming sockets for retaining the ends of a bail.

These and other features of the invention will now be described in detail in the specification and then pointed out more particularly in the appended claims.

In the drawings:

Fig. 1 is a sectional view of a filter element embodying features of the present invention;

Fig. 2 is an end view of the filter element shown in Fig. 1 looking in the direction of arrows 2; and Fig. 3 is an exploded and perspective view of elements forming a seal and as shown in their assembled relation in Figs. 1 and 2.

The filter element comprises two concentric and perforated tubular members 10 and 12 joined by means of two discs or end plates 14 and 16. The end plates connect the concentric members 10 and 12 suitably to enclose a filtering material 18 which may be pleated or of an accordion type formed of sheet porous material or it may be composed of a cylinder of cotton batting. It is to be understood that the present invention is not concerned with the nature or form of the body of porous filtering material 18 as such material may take various forms well-known in the art without departing from the spirit of the present invention.

The end plates 14 and 16 are similar in all respects and it will be noted that plate 16 is provided with a central aperture 20 defined by an outwardly directed flange 22. The outer margin of the plate 16 is so formed as to constitute a cylindrical portion 24 which will fit within the outer perforated member 10. A doubled-over portion 26 cooperates with the cylindrical portion 24 tightly to retain the end margin of the tubular member 10.

A ring or annular member 28 has a radial portion 30 which is spot welded at points 32 to the end plate 16. The portion 30 is so formed as to provide diametrically opposed and axially aligned loops or sockets 34 and 36. The ring 28 also is formed with a cylindrical flange 38 having integral and inwardly extending projections 40. Conveniently, these projections are made by indenting the flange material.

A sealing gasket 42 of annular form and having a rectangular cross section is retained between the flanges 22 and 38 and fixed in position against axial movement by the projections 40 which are so placed as to extend into the yielding and resilient material of the gasket.

A bail member 44 formed of wire is made with coaxial end portions 48 and 50 and these portions are seated in the sockets 34 and 36.

The end plate 14 is provided with a ring member 52 which is similar in all respects to the ring member 28 and which retains a gasket 53. It is to be understood, however, that in this case no sockets for a bail need be provided although the presence of such sockets would not be objectionable.

In manufacturing the filter element, the perforated tubular members 10 and 12 and the end plates 14 and 16 are joined as heretofore practiced in the art, the filter material 18, of course, being confined thereby. In forming the end plates 14 and 16, however, the rings 28 and 52 are preferably spot welded to the end plates before assembly of the latter in the filter unit. Attachment of the sealing gaskets 42 and 53 is simultaneously performed by merely forcing the rings 30 and 52 in place over the gaskets preparatory to the spot welding step. The gaskets are firmly held in position as the inside diameter of the circle defined by the projections is smaller than the outside diameter of the gasket and the projections are imbedded in the latter.

The bail 44 may easily be sprung into its position or placed in the assembly prior to the spot welding, but its ends are firmly held in the sockets and against the end plate 16. Requisite structural strength is thereby provided in the bail and its attachment for removing a used filter unit from its casing without breaking the unit or necessitating prying it out piece by piece.

It will be noted that the process of manufacture is independent of the slow and costly use of adhesives heretofore used in attaching the sealing gaskets and that a simple arrangement is provided to secure the requiste attachment of both the gasket and bail.

I claim:

1. A filter element sealing construction comprising an end plate having an aperture, a resilient sealing gasket superposed along the margin of said end plate defining said aperture, a retainer fixed to said end plate having a substantially cylindrical wall surrounding said gasket, spaced parts of said wall being clear of said plate and retaining said gasket against said end plate, opposed sockets defined by said plate and retainer, and a bail having opposite ends seated in said sockets.

2. A filter element sealing construction comprising an end plate having a flange defining an aperture, an annular flat sealing gasket with an interior face engaging the said end plate around said flange, a retainer fixed to said end plate and having a substantially cylindrical wall closely surrounding said gasket with one edge terminating short of the exterior face of said gasket, spaced indents in said wall extending toward said flange and spaced from said end plate, and portions of material of said gasket being confined between said spaced parts and said end plate for retaining the said gasket in position on the element.

References Cited in the file of this patent

UNITED STATES PATENTS

| | | |
|---|---|---|
| 519,829 | Beery | May 15, 1894 |
| 1,654,615 | Smith | Jan. 3, 1928 |
| 2,076,935 | Burckhalter | Apr. 13, 1937 |
| 2,131,509 | Goepel et al. | Sept. 27, 1938 |
| 2,218,800 | Williams | Oct. 22, 1940 |
| 2,294,262 | Wilkinson | Aug. 25, 1942 |
| 2,468,862 | Briggs | May 3, 1949 |
| 2,576,144 | Rood | Nov. 27, 1951 |
| 2,597,770 | Alexander et al. | May 20, 1952 |
| 2,680,521 | Kamrath | June 8, 1954 |
| 2,732,077 | Robinson | Jan. 24, 1956 |